United States Patent [19]

Soula

[11] 4,373,070
[45] Feb. 8, 1983

[54] SEQUESTERING AGENTS

[75] Inventor: Gérard Soula, Meyzieu, France

[73] Assignee: Rhone-Poulenc Industries, Paris, France

[21] Appl. No.: 296,212

[22] Filed: Aug. 25, 1981

[30] Foreign Application Priority Data

Aug. 27, 1980 [FR] France .............................. 80 18562

[51] Int. Cl.³ ............................................ C08L 65/00
[52] U.S. Cl. .................................. 525/332.2; 525/379;
525/366; 525/360; 525/370; 423/179; 423/155;
423/138; 423/111; 423/99; 423/89; 423/87;
423/69; 423/62; 423/53; 423/49; 423/23;
423/22; 423/21.1; 525/332.9; 525/333.6
[58] Field of Search ................ 525/333, 379, 366, 334

[56] References Cited

U.S. PATENT DOCUMENTS

| | | | |
|---|---|---|---|
| 3,337,480 | 8/1967 | Small | 260/2.2 |
| 3,441,545 | 4/1969 | Blatz et al. | 260/78.5 |
| 3,899,472 | 8/1975 | Aya et al. | 260/80.78 |
| 3,944,424 | 3/1976 | Cohen et al. | 96/119 R |
| 4,193,800 | 3/1980 | Iwama et al. | 430/213 |
| 4,230,828 | 10/1980 | Gaul, Jr. et al. | 525/153 |
| 4,281,086 | 7/1981 | Gaul, Jr. et al. | 525/330 |
| 4,330,642 | 5/1982 | Gaul, Jr. et al. | 525/337 |

OTHER PUBLICATIONS

"Angewandte Chemie", International edition, 18/1, 1979, pp. 421-429.
"Journal of Pure and Applied Chemistry", vol. 51, No. 12, Reactions On and With Polymers", Manecke and Reuter, 1979, pp. 2313-2330.

*Primary Examiner*—Joseph L. Schofer
*Assistant Examiner*—Bernard Lipman
*Attorney, Agent, or Firm*—Burns, Doane, Swecker & Mathis

[57] ABSTRACT

Novel sequestering agents useful for the extraction of metal values and in various organic syntheses comprise a cross-linked organic polymeric substrate, said substrate having covalently coupled thereto a plurality of functional groups, the free valence of which having the structural formula:

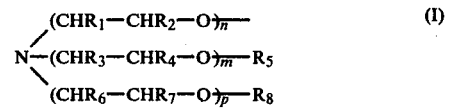

wherein $R_1$, $R_2$, $R_3$, $R_4$, $R_6$ and $R_7$, which are identical or different, each represents a hydrogen atom or an alkyl radical having 1 to 4 carbon atoms, $R_5$ and $R_8$, which are also identical or different, each represents a hydrogen atom, an alkyl or cycloalkyl radical having 1 to 12 carbon atoms, a phenyl radical, a $-C_gH_{2q}-\phi$ or $C_qH_{2+1}-\phi-$ radical, and further wherein q ranges from 1 to about 12, and n, m and p, which are also identical or different, range from 1 to 10, and $\phi$ is phenyl.

36 Claims, No Drawings

SEQUESTERING AGENTS

CROSS-REFERENCE TO RELATED APPLICATION

Locatelli et al copending application, Ser. No. 296,212 filed concurrently herewith, and assigned to the assignee hereof.

BACKGROUND OF THE INVENTION

1. Field of the Invention

The present invention relates to novel supported sequestering agents, with "supported sequestering agent" being defined as an agent capable of combining with various cations to form a complex therewith, said agent being covalently tethered to a support substrate.

The present invention also relates to the preparation of such novel sequestering agents, and to the use thereof in organic synthesis and for the extraction of various metals.

2. Description of the Prior Art

Known to this general art [compare *Angew. Chem. Int.*, English Edition, 18, 421–429 (1979)], are polystyrene resins bearing quaternary ammonium groups having the structural formula:

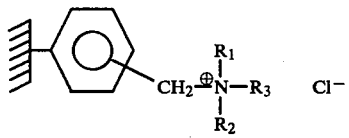

wherein $R_1$, $R_2$ and $R_3$ are essentially alkyl radicals, and

is the polystyrene backbone.

The principal disadvantage which limits the use of such resins on an industrial scale is, most notably, their lack of stability at temperatures in excess of about 100° C.

In the aforenoted reference, there are also described certain "crown ethers" and "cryptants" grafted onto polystyrene backbones, the same being prepared by the reaction of appropriate amine derivative, the crown ether or the cryptant, with a chloromethyl polystyrene.

These substituted polymers, for example, those of the structural formulae:

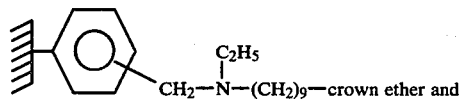

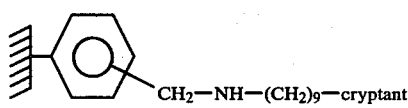

are much more useful than the aforesaid ammonium salts borne by polystyrene backbones by virtue of their greater activity and their better thermal stability. Nevertheless, there remain a certain number of disadvantages which do not favor their utilization on an industrial scale. Indeed, the crown ethers and cryptants are themselves compounds having highly sophisticated and complex molecular structures. It thus follows that the processes for the preparation thereof and their actual utilization are quite critical. Furthermore, their cost of production is extremely high. And these same disadvantages are multiplied on the level of the more complex macromolecules obtained after grafting same onto a polystyrene backbone.

The three types of products noted hereinabove have been tested in the prior art in nucleophilic substitution reactions by liquid/liquid phase transfer catalysis, such as in the halogen exchange reaction of bromooctane to 1-iodooctane and in nucleophilic substitution reactions by liquid/liquid phase transfer catalysis, such as, for example, in the reaction of benzyl chloride with alkaline acetates to yield benzyl acetate [*Pure and Appln. Chem.*, 51, pp 2313–2330 (1979)].

Thus, serious need exists in this art for a novel class of sequestering agents which avoids those disadvantages and drawbacks above outlined.

SUMMARY OF THE INVENTION

Accordingly, a major object of the present invention is the provision of an improved class of sequestering agents, the same comprising a cross-linked organic polymeric substrate, said substrate having covalently tethered thereto a plurality of functional groups having the structural formula:

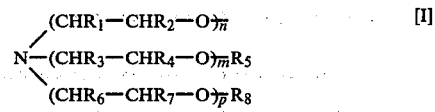

wherein $R_1$, $R_2$, $R_3$, $R_4$, $R_6$ and $R_7$, which are identical or different, each represents a hydrogen atom or an alkyl radical having 1 to 4 carbon atoms, $R_5$ and $R_8$, which are also identical or different, each represents a hydrogen atom, an alkyl or cycloalkyl radical having 1 to 12 carbon atoms, a phenyl radical, a $—C_qH_{2q}—\phi$ or $C_qH_{2+1}—\phi—$ radical with $q$ greater than or equal to 1 and smaller than or equal to approximately 12, and wherein $n$, $m$ and $p$, also identical or different, are greater than or equal to 1 and smaller than or equal to 10, and $\phi$ is phenyl.

DETAILED DESCRIPTION OF THE INVENTION

More particularly according to this invention, $R_1$, $R_2$, $R_3$, $R_4$, $R_6$ and $R_7$, which may be identical or different, preferably represent a hydrogen atom or a methyl radical, and $R_5$ and $R_8$ which may also be identical or different, each preferably represents a hydrogen atom or an alkyl radical having 1 to 4 carbon atoms. According to another preferred embodiment of the invention, $n$, $m$ and $p$, also identical or different, are greater than or equal to 1 and less than or equal to 6.

The moieties of the following structural formulae are exemplary of functional groups consistent with the present invention:

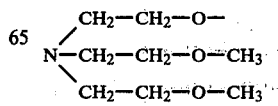

-continued

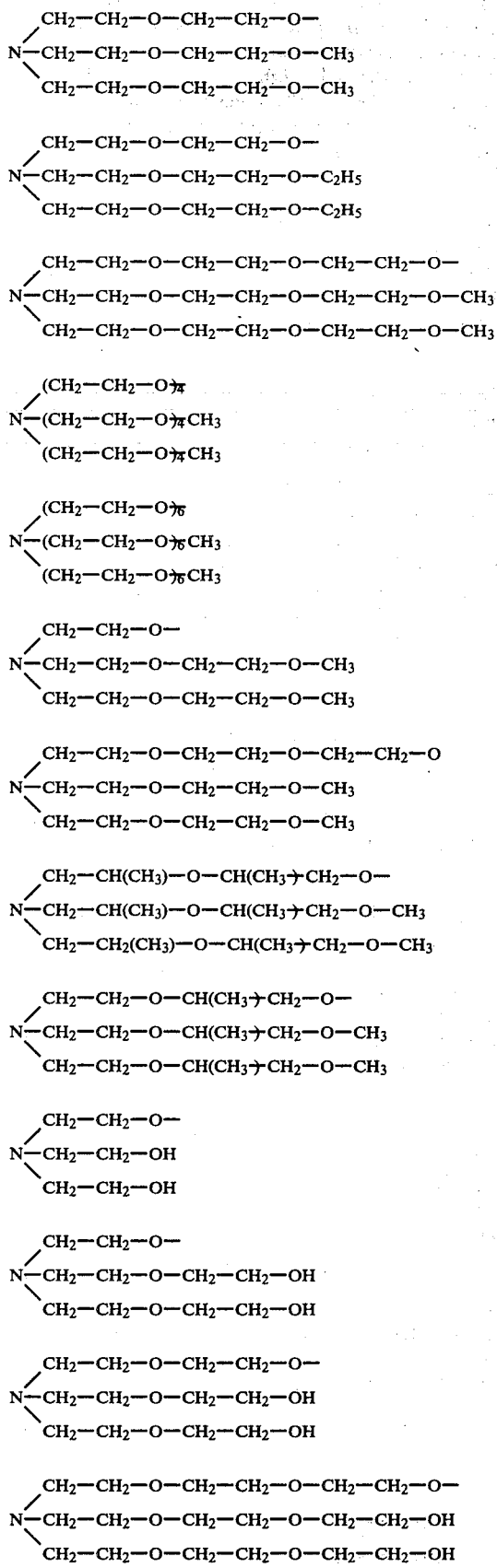

-continued

N(CH₂—CH₂—O—CH₂—CH₂—O—)(CH₂—CH₂—O—CH₂—CH₂—OH)(CH₂—CH₂—O—CH₂—CH₂—O—CH₃)

The support substrate is advantageously derived from a cross-linked organic polymer containing groups that may be facilely substituted with the functional groups of Formula I.

Exemplary of organic polymers suitable as backbone substrates according to the present invention are polymers derived from vinyl-aromatic compounds, such as styrene, methylstyrene and the copolymers of vinyl-aromatic compounds and $C_4$–$C_6$ conjugated dienes, such as the copolymers of styrene and butadiene and of styrene and isoprene.

Polystyrene is the preferred organic polymer, and, in which case, the preferred cross-linking agent is divinylbenzene. The degree of cross-linking too is an important factor. In particular, it is of course necessary that the functional groups of Formula 1 which are grafted onto the polystyrene backbone be active. For this, it is necessary that the molecules of the solvent with which the supported sequestering agent is to be employed, be capable of penetrating into the polymer. For this reason, it is required that the degree of cross-linking not be excessively high such that the penetration of the solvent and the reagents will not be hindered. It is preferred to employ a polystyrene wherein the amount of cross-linking by the divinylbenzene does not exceed about 10%. Even more preferred is a cross-linking degree of less than approximately 5%.

Preferred groups on the polystyrene adapted for substitution are chlorine or bromine, or the chloro- or bromomethyl radical, —CH₂Cl or —CH₂Br, attached to the benzene nucleus of the polystyrene.

In another preferred embodiment of the invention, the percentage of the benzene rings of the polystyrene bearing a functional group is higher than 10%.

The preferred supported sequestering agents are those of the following structural formulae:

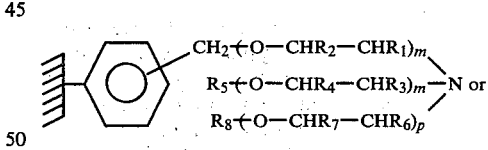

derived from chloro- or bromomethyl polystyrene, cross-linked with divinylbenzene and having the formula:

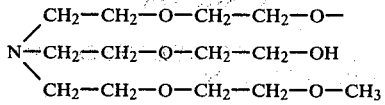

wherein X represents Cl or Br.

The present invention also relates to a process for the preparation of the sequestering agents defined hereinabove. The process according to the invention is characterized in that a compound of the formula:

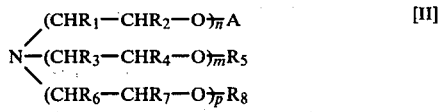

wherein A represents an alkali metal and $R_1$, $R_2$, $R_3$, $R_4$, $R_5$, $R_6$, $R_7$, $R_8$, $n$, $m$ and $p$ are as defined above, is reacted with a cross-linked organic polymer containing the aforesaid groups adapted for substitution, at a temperature ranging from about 20° to 150° C., in an aprotic solvent.

In a preferred process embodiment of the invention, A represents sodium or potassium.

According to yet another preferred embodiment of the invention, the solvent is advantageously selected from the group comprising benzene, toluene, N-methylpyrrolidone, hexamethylphosphorotriamide, dioxane, tetrahydrofuran, dimethoxyethane and sulfolane.

In another preferred embodiment of the invention, a chloro- or bromomethyl polystyrene having a degree of cross-linking with divinylbenzene of less than 10% and having a proportion of chlorine or bromine between approximately 0.5 and approximately 7 milliequivalents of chlorine or bromine/g, is reacted with the compound of Formula [II].

The supported sequestering agents according to the invention form complexes with the ammonium cation $NH_4^+$ and its derivatives and the cations derived from metals of Groups $I_A$, $II_A$, $III_A$, $IV_A$, $V_A$, $VI_A$, $VII_A$, VIII, $I_B$, $II_B$, $III_B$, $IV_B$ and $V_B$ of the Periodic Table.

More particularly, the supported sequestering agents according to the invention form complexes with:

(i) $NH_4^+$ and the derivatives $RNH_3^+$ wherein R is an alkyl radical or an aryl radical; and (ii) the cations derived from the metals:
Li, Na, K, Rb, Co,
Mg, Ca, Sr, Ba,
Sc, Y, La and lanthanides, Ac and actinides,
Ti, Zr, Hj,
V, Nb, Ta,
Cr, Nb, Ta,
Mn, Tc, Re,
Fe, Co, Ni,
Ru, Rh, Rd,
Os, Ir, Pt,
Cu, Ag, Au,
Zn, Cd, Hg,
Al, Ga, In, Tl,
Ge, Sn, Pb,
Sb, Bi.

The invention also relates to the use of the subject sequestering agents in organic synthesis. In effect, the supported sequestering agents according to the invention enable the reaction, in suitable solvent, of an ionic organic or inorganic reagent typically insoluble in such solvent, with a substrate soluble in said solvent, with the sequestering agents added to the reaction medium enabling intimate contact, in the medium, of the reagent and the substrate.

As mentioned hereinabove, even though the support may be insoluble in the solvent, the latter may penetrate the cross-linked polymer and transport the ionic reagent to the functional groups of Formula I grafted onto the support. The functional groups then complex the cation of the ionic reagent, whereupon the complexed entity may be considered as being in solution in the solvent wherein the substrate is soluble.

The immediately aforesaid, thus, permits the reaction to take place.

These anionic, organic or inorganic reagents have the general formula $M^+Y^-$, wherein $M^+$ represents one of the aforenoted cations and $Y^-$ represents an organic or inorganic anion. Exemplary of inorganic anions are $CN^-$, $SCN^-$, $F^-$, $Bn^-$, $I^-$ and exemplary of organic anions are the phenates, alcoholates, thioalcoholates, thiophenates, silanolates and carboxylates.

As examples of syntheses that may be effected with the supported sequestering agents according to the invention, syntheses employing nucleophilic substitution reactions, such as, for example, the substitution of a halogen on an aliphatic or aromatic substrate by a $Y^-$ group, such as defined hereinabove, are representative.

The advantages to be obtained from the application of the supported sequestering agents according to the invention reside primarily in their ease of separation from the reaction medium upon completion of the reaction. This separation may be effected by simple decantation or filtration. Secondly, the high possible rate of recycling of the sequestering agent must be emphasized; this improves the economy of the process.

The invention also relates to the use of the subject sequestering agents in the extraction of metals by the same mechanism enunciated in the case of organic synthesis. It is in effect possible to extract organic or inorganic salts from an aqueous solution by the simple contact of such solution with at least one supported sequestering agent according to the invention, optionally impregnated with a solvent, such that the latter, as mentioned hereinabove, activates the functional groups of Formula I, if this is required.

As an example of this phenomenon, the extraction of sodium picrate from an aqueous solution thereof is representative.

The advantages deriving from the employment of the sequestering agents according to the invention for the extraction of metals are principally found by reason of the fact that there ensues no contamination by the supported sequestering agents of the aqueous phase from which the metallic salts are extracted. On the other hand, the recycling rate possible after regeneration of the sequestering agent enhances the economy of the process.

The compounds having the structural formula:

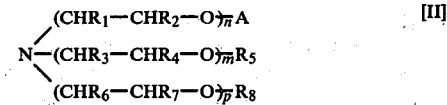

may be prepared by reaction of an alkali metal, in metallic state, in an organic solvent medium (toluene, tetrahydrofuran, dioxane, for example) at a temperature between approximately 20° and 90° C. for 4 to 6 h, with an amino alcohol:

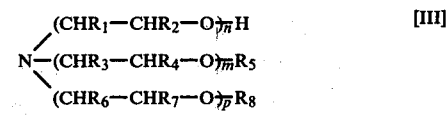

itself prepared by the reaction of a polyalkylene glycol having the structural formula:

$$HO-(CHR_1-CHR_2O)_nH$$

wherein $R_1$, $R_2$ and n are as above defined, with a bis(polyoxaalkyl) amine having the formula:

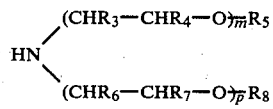

wherein $R_3$ to $R_8$ and m and p also are as above defined, the molar ratio of the polyalkylene glycol to the bis(polyoxaalkyl)amine being at least 1.5, in the presence of a hydrogenation/dehydrogenation catalyst at a temperature between 120° C. and 220° C., preferably between 150° C. and 200° C.

Exemplary of the catalyst, nickel catalysts of the Raney or Harshaw nickel type are representative, the amount of the catalyst being between 1 and 15% by weight (preferably between 2 and 6%).

The molar ratio of the polyalkylene glycol to the bis(polyoxaalkyl)amine is preferably between 1.5 times and 10 times the stoichiometric amount (even more preferably between 2 and 6 times the stoichiometric amount). The reaction is preferably effected in the presence of hydrogen (1 to 10% by weight of hydrogen is used with respect to the polyalkylene glycol employed) under atmospheric pressure.

In order to further illustrate the present invention and the advantages thereof, the following specific examples are given, it being understood that same are intended only as illustrative and in nowise limitative.

EXAMPLE 1

Into a three-necked, 250 ml reactor, equipped with a magnetic stirrer, a reflux condenser and a nitrogen inlet, the following materials were successively introduced: 100 cm³ anhydrous toluene, 13 g N-(8'-hydroxy-3',6'-dioxaoctyl)-11-aza-2,5,8,14,17,20-hexaoxaheneicosane (prepared as outlined hereinbelow), and 0.69 g metallic sodium. After 6 hours at 60° C. under agitation, the sodium had completely disappeared. Subsequently, 14.8 g polystyrene, cross-linked with 2% divinylbenzene, were introduced; same contained $1.35 \times 10^{-3}$ chloromethyl groups per gram of polymer, to be noted as 1.35 meq of chlorine/g. The mixture was heated to 60° C. for 48 hours under a nitrogen atmosphere. After cooling, the polymer was filtered and washed with water (to eliminate salts) and then with methanol.

The product was then dried under a vacuum at 50° C.

In this fashion, 20 g of an aminoether grafted onto the polystyrene were obtained, the structural formula of which was as follows:

The degree of grafting was 77%.

Preparation of N-(8'-hydroxy-3',6'-dioxaoctyl)-11-aza-2,5,8,14 17,20-Hexaoxaheneicosane:

$$\begin{array}{l}CH_2CH_2OCH_2CH_2OCH_2CH_2OCH_3 \\ N-CH_2CH_2OCH_2CH_2OCH_2CH_2OCH_3 \\ CH_2CH_2OCH_2CH_2OCH_2CH_2OH\end{array}$$

Into a 2 liter, three-necked flask, equipped with stirring means, a hydrogen inlet, a column and a condenser to collect the water, the following materials were charged:

| (i) | 11-Aza-2,5,8,14,17,20-hexaoxaheneicosane | 250 g | (0.80 mole) |
|---|---|---|---|
| (ii) | Triethylene glycol | 550 g | (3.66 mole) |
| (iii) | Raney nickel (dehydrated) | 50 g | |

After 5 hours of reaction at 180° under a stream of hydrogen (1 liter/min) the Raney nickel was filtered and the filtrate was evaporated to 300° under 0.1 mmHg (13.3 Pa).

325 g of the desired aminoalcohol were obtained, representing a yield of 92.2%.

EXAMPLE 2

Following the procedure and under the conditions outlined in Example 1, the following materials were introduced: 100 cm³ toluene, 14.3 g N-(8'-hydroxy-3',6'-dioxaoctyl)-9-aza-3,6,12,15-tetraoxaheptadecane prepared in a fashion similar to that described hereinabove, and 0.69 g metallic sodium. After 6 hours at 60° C., 5 g polystyrene cross-linked with 8% divinylbenzene and containing 4 meq/g of chlorine, were added. Heating was continued for 20 hours, followed by cooling and filtering of the mixture.

The precipitate was washed with water and then with methanol.

After drying at 50° C. under vacuum, 9.2 g of graft polymer were obtained, having the structural formula:

$$\begin{array}{l}CH_2-O-CH_2-CH_2-O-CH_2-CH_2-O-CH_2-CH_2 \\ C_2H_5-O-CH_2-CH_2-O-CH_2-CH_2-N \\ C_2H_5-O-CH_2-CH_2-O-CH_2-CH_2\end{array}$$

The degree of grafting was 65%.

EXAMPLE 3

Following the procedure and under the conditions outlined in Example 1, 300 cm³ toluene, 36.05 g N-(5'-hydroxy-3'-oxapentyl)-8-aza-2,5,11,14-tetraoxapentadecane and 2.41 g metallic sodium were introduced. After heating at 60° C. for 20 hours and at 90° C. for 4 hours, the sodium had completely reacted. The mixture was then cooled and 52 g polystyrene cross-linked with $$\begin{array}{l}CH_2-O-CH_2-CH_2-O-CH_2-CH_2-O-CH_2-CH_2 \\ CH_3-O-CH_2-CH_2-O-CH_2-CH_2-O-CH_2-CH_2-N \\ CH_3-O-CH_2-CH_2-O-CH_2-CH_2-O-CH_2-CH_2\end{array}$$

2% divinylbenzene and containing 1.3 meq chlorine/g, were introduced.

After 40 hours at 60° C. under a nitrogen blanket, the mixture was cooled, filtered and the polymer washed with water and then with methanol. After drying under vacuum at 50° C., 66 g of the graft polymer were obtained, having the following structural formula:

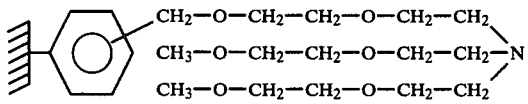

The degree of grafting is 75%.

EXAMPLE 4

Following the procedure and under the conditions outlined in Example 1, the following materials were introduced: 100 cm³ toluene, 10.9 g N-(2'-hydroxyethyl)-9-aza-3,6,12,15-tetraoxaheptadecane, and 0.69 g metallic sodium. After 6 hours at 60° C., 4.65 g polystyrene cross-linked with 4% divinylbenzene, and containing 4.3 meq chlorine/g, were added. After 30 hours at 80° C. the mixture was cooled and filtered. The precipitate was washed with water and methanol and then dried at 50° C. under vacuum. 5 g of the graft polymer were obtained, having the following structural formula:

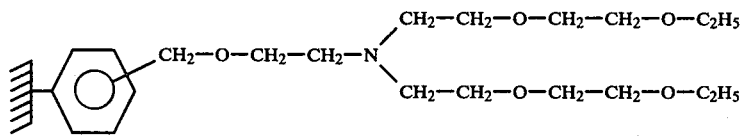

EXAMPLE 5

Following the procedure and under the conditions outlined in Example 1, the following materials were introduced: 100 ml toluene, 60 g tris-(8-hydroxy-3,6-dioxaoctyl)amine and 0.69 g metallic sodium. After heating at 50° C. for 24 hours, 5 g polystyrene cross-/linked with 2% divinylbenzene, and containing 4 meq chlorine/g, were introduced.

After 56 hours at 60° C., the mixture was cooled, filtered and the polymer washed with water and then with methanol. After drying under vacuum at 50° C., 9.5 g of graft polymer were obtained, having the following structural formula:

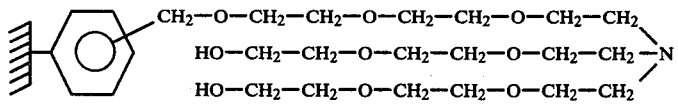

The degree of grafting was 63%.

EXAMPLE 6

The compound prepared in Example 1 was used to effect the following reaction:

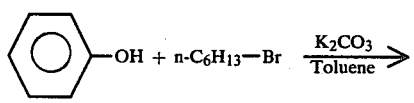

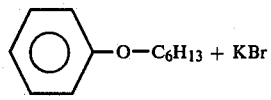

Into a 100 ml reactor equipped with a reflux condenser and a magnetic stirrer, 37 g toluene, 3.77 g phenol, 6.6 g n-bromohexane and 2.8 g K₂CO₃ were introduced, together with 0.96 g of the product obtained according to Example 1. The mixture was heated with reflux under agitation for 20 hours and then cooled. The yield in 1-phenoxyhexane was 80%. The mixture was filtered and the precipitate obtained was washed with water and then methanol. After drying at 50° C. under vacuum, 0.94 g polymer, identical to the one introduced, were obtained.

Recycling in a subsequent reaction afforded the same result.

Without the catalyst, the degree of transformation was 10% after 20 hours.

EXAMPLE 7

The compound prepared in Example 1 was used in the following reaction:

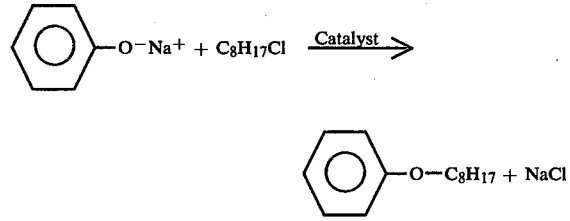

Into a 100 ml reactor equipped with a reflux condenser and a magnetic stirrer, 17 g 1-chlorooctane, 1.16 g anhydrous sodium phenate and 0.31 g of the product prepared according to Example 1, were introduced. The mixture was heated to 140° C. for 3 hours, 30 minutes. 1-Phenoxyoctane was obtained in a yield of 96%.

The mixture was filtered after cooling and the precipitate washed with water and methanol.

After drying at 50° C. under vacuum, 0.30 g polymer was recovered. Recycling of the product in a subsequent experiment afforded identical results.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A composition of matter comprising a cross-linked organic polymeric substrate, said substrate having covalently coupled thereto a plurality of functional groups, the free valence of which having the structural formula:

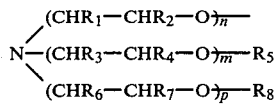  (I)

wherein $R_1$, $R_2$, $R_3$, $R_4$, $R_6$ and $R_7$, which are identical or different, each represents a hydrogen atom or an alkyl radical having 1 to 4 carbon atoms, $R_5$ and $R_8$, which are also identical or different, each represents a hydrogen atom, an alkyl or cycloalkyl radical having 1 to 12 carbon atoms, a phenyl radical, a $-C_qH_{2q}-\phi$ or $C_qH_{2q+1}-\phi-$ radical, and further wherein q ranges from 1 to about 12, and n, m and p, which are also identical or different, range from 1 to 10, and $\phi$ is phenyl.

2. The composition of matter as defined by claim 1, wherein $R_1$, $R_2$, $R_3$, $R_4$, $R_6$ and $R_7$, which may be identical or different, each represents a hydrogen atom or a methyl radical, and $R_5$ and $R_8$, which may also be identical or different, each represents a hydrogen atom or an alkyl radical having 1 to 4 carbon atoms.

3. The composition of matter as defined by claims 1 or 2, wherein n, m and p, which may be identical or different, each ranges from 1 to 6.

4. The composition of matter as defined by claims 1 or 2, said cross-linked organic polymeric substrate comprising a cross-linked vinyl-aromatic synthetic polymer or a cross-linked vinyl-aromatic/$C_4$–$C_6$ conjugated diene synthetic copolymer.

5. The composition of matter as defined in claim 4, said cross-linked organic polymeric substrate being a styrene or methylstyrene polymer, or copolymer or styrene with butadiene or isoprene.

6. The composition of matter as defined in claim 5, said cross-linked organic polymeric substrate being polystyrene.

7. The composition of matter as defined by claim 4, said organic polymeric substrate being cross-linked with divinylbenzene.

8. The composition of matter as defined by claim 4, said organic polymeric substrate being less than about 10% cross-linked.

9. The composition of matter as defined by claim 8, said organic polymeric substrate being less than about 5% cross-linked.

10. The composition of matter as defined by claim 6, at least 5% of the benzene nuclei comprising said polystyrene having said functional groups (I) covalently coupled thereto.

11. The composition of matter as defined by claim 10, at least 10% of the benzene nuclei comprising said polystyrene having said functional groups (I) covalently coupled thereto.

12. A process for the preparation of the composition of matter as defined by claim 1, comprising reacting a tertiary amine having the structural formula:

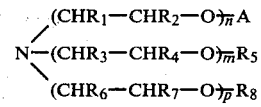  (II)

wherein A is an alkali metal, with a cross-linked organic polymer bearing substituents which interreact with said alkali metal, A, in an aprotic solvent.

13. The process as defined in claim 12, said reaction being conducted at a temperature of from about 20° to 150° C.

14. The process as defined in claim 12, said cross-linked organic polymer comprising a cross-linked vinyl-aromatic synthetic polymer or a cross-linked vinyl-aromatic/$C_4$-$C_6$ conjugated diene synthetic copolymer.

15. The process as defined in claim 14, said cross-linked organic polymer being a styrene or methylstyrene polymer, or copolymer of styrene with butadiene or isoprene.

16. The process as defined by claim 15, said cross-linked organic polymer being polystyrene.

17. The process as defined by claim 14, said organic polymer being cross-linked with divinylbenzene.

18. The process as defined by claim 16, said substituents which interreact with said alkali metal, A, being chloromethyl or bromomethyl groups.

19. The process as defined by claim 18, the polymer comprising from 0.5 to 7 milliequivalents of chlorine or bromine per gram.

20. The process as defined in claim 14, said organic polymer being less than about 10% cross-linked.

21. The process as defined by claim 20, said organic polymer being less than about 5% cross-linked.

22. The composition of matter as defined by claim 1, the free valence of said functional groups having the structural formula:

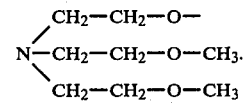

23. The composition of matter as defined by claim 1, the free valence of said functional groups having the structural formula:

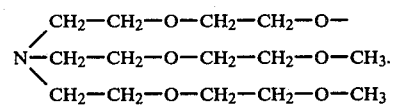

24. The composition of matter as defined by claim 1, the free valence of said functional groups having the structural formula:

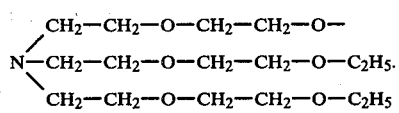

25. The composition of matter as defined by claim 1, the free valence of said functional groups having the structural formula:

$$N\begin{cases}CH_2-CH_2-O-CH_2-CH_2-O-CH_2-CH_2-O-\\ CH_2-CH_2-O-CH_2-CH_2-O-CH_2-CH_2-O-CH_3.\\ CH_2-CH_2-O-CH_2-CH_2-O-CH_2-CH_2-O-CH_3\end{cases}$$

26. The composition of matter as defined by claim 1, the free valence of said functional groups having the structural formula:

$$N\begin{cases}(CH_2-CH_2-O)_{\overline{4}}\\ (CH_2-CH_2-O)_{\overline{4}}CH_3.\\ (CH_2-CH_2-O)_{\overline{4}}CH_3\end{cases}$$

27. The composition of matter as defined by claim 1, the free valence of said functional groups having the structural formula:

$$N\begin{cases}(CH_2-CH_2-O)_{\overline{6}}\\ (CH_2-CH_2-O)_{\overline{6}}CH_3.\\ (CH_2-CH_2-O)_{\overline{6}}CH_3\end{cases}$$

28. The composition of matter as defined by claim 1, the free valence of said functional groups having the structural formula:

$$N\begin{cases}CH_2-CH_2-O-\\ CH_2-CH_2-O-CH_2-CH_2-O-CH_3.\\ CH_2-CH_2-O-CH_2-CH_2-O-CH_3\end{cases}$$

29. The composition of matter as defined by claim 1, the free valence of said functional groups having the structural formula:

$$N\begin{cases}CH_2-CH_2-O-CH_2-CH_2-O-CH_2-CH_2-O-\\ CH_2-CH_2-O-CH_2-CH_2-O-CH_3\\ CH_2-CH_2-O-CH_2-CH_2-O-CH_3\end{cases}$$

30. The composition of matter as defined in claim 1, the free valence of said functional groups having the structural formula:

$$N\begin{cases}CH_2-CH(CH_3)-O-CH(CH_3)-CH_2-O-\\ CH_2-CH(CH_3)-O-CH(CH_3)-CH_2-O-CH_3.\\ CH_2-CH_2(CH_3)-O-CH(CH_3)-CH_2-O-CH_3\end{cases}$$

31. The composition of matter as defined in claim 1, the free valence of said functional groups having the structural formula:

$$N\begin{cases}CH_2-CH_2-O-CH(CH_3)-CH_2-O-\\ CH_2-CH_2-O-CH(CH_3)-CH_2-O-CH_3.\\ CH_2-CH_2-O-CH(CH_3)-CH_2-O-CH_3\end{cases}$$

32. The composition of matter as defined by claim 1, the free valence of said functional groups having the structural formula:

$$N\begin{cases}CH_2-CH_2-O-\\ CH_2-CH_2-OH.\\ CH_2-CH_2-OH\end{cases}$$

33. The composition of matter as defined by claim 1, the free valence of said functional groups having the structural formula:

$$N\begin{cases}CH_2-CH_2-O-\\ CH_2-CH_2-O-CH_2-CH_2-OH.\\ CH_2-CH_2-O-CH_2-CH_2-OH\end{cases}$$

34. The composition of matter as defined by claim 1, the free valence of said functional groups having the structural formula:

$$N\begin{cases}CH_2-CH_2-O-CH_2-CH_2-O-\\ CH_2-CH_2-O-CH_2-CH_2-OH.\\ CH_2-CH_2-O-CH_2-CH_2-OH\end{cases}$$

35. The composition of matter as defined by claim 1, the free valence of said functional groups having the structural formula:

$$N\begin{cases}CH_2-CH_2-O-CH_2-CH_2-O-CH_2-CH_2-O-\\ CH_2-CH_2-O-CH_2-CH_2-O-CH_2-CH_2-OH.\\ CH_2-CH_2-O-CH_2-CH_2-O-CH_2-CH_2-OH\end{cases}$$

36. The composition of matter as defined by claim 1, the free valence of said functional groups having the structural formula:

$$N\begin{cases}CH_2-CH_2-O-CH_2-CH_2-O-\\ CH_2-CH_2-O-CH_2-CH_2-OH\\ CH_2-CH_2-O-CH_2-CH_2-O-CH_3\end{cases}$$

* * * * *